United States Patent [19]
Humpert et al.

[11] Patent Number: 5,992,457
[45] Date of Patent: Nov. 30, 1999

[54] SINGLE-LEVER MIXING VALVE WITH OVERRIDE

[75] Inventors: Jürgen Humpert, Hemer; Eckhard Gransow, Fröndenberg; Harald Dickel, Iserlohn, all of Germany

[73] Assignee: Friedrich Grohe AG, Hemer, Germany

[21] Appl. No.: 08/881,019

[22] Filed: Jun. 23, 1997

[30] Foreign Application Priority Data

Jul. 18, 1996 [DE] Germany .................. 196 28 937

[51] Int. Cl.[6] .................. F16K 11/065; F16K 35/02
[52] U.S. Cl. .................. 137/625.17; 137/625.4; 251/288
[58] Field of Search .................. 251/285, 288; 137/625.17, 625.4, 625.41

[56] References Cited

U.S. PATENT DOCUMENTS

| | | |
|---|---|---|
| 4,610,272 | 9/1986 | Gottwald . |
| 5,082,023 | 1/1992 | D'Alayer De Costemore D'Arc .. 251/285 X |
| 5,363,880 | 11/1994 | Hsieh .................. 137/625.17 |
| 5,404,911 | 4/1995 | Tres Casas .................. 137/625.17 |
| 5,522,429 | 6/1996 | Bechte et al. .................. 137/625.17 |

FOREIGN PATENT DOCUMENTS

| | | |
|---|---|---|
| 0096005 | 12/1983 | European Pat. Off. . |
| 0189170 | 7/1986 | European Pat. Off. . |
| 0 426 639 | 5/1991 | European Pat. Off. . |
| 0643246 | 3/1995 | European Pat. Off. . |
| 0 662 577 | 7/1995 | European Pat. Off. . |
| 0699856 | 3/1996 | European Pat. Off. . |
| 3402103 | 3/1985 | Germany . |
| 36 07 349 | 9/1987 | Germany . |

*Primary Examiner*—John Rivell
*Assistant Examiner*—Meredith H. Schoenfeld
*Attorney, Agent, or Firm*—Hebert Dubno; Andrew Wilford

[57] ABSTRACT

A valve assembly has a housing having an abutment and a valve cartridge in the housing having an actuating stem displaceable about a flow-control axis for varying a flow rate between a maximum flow and a minimum flow and about a temperature-control axis for varying temperature of the flow. A handle connected to the stem carries another abutment engageable with the housing abutment in a position of the valve cartridge corresponding to partial flow through the cartridge. A deflectable override button on the handle is operable to displace the handle abutment out of engagement with the housing abutment.

14 Claims, 9 Drawing Sheets

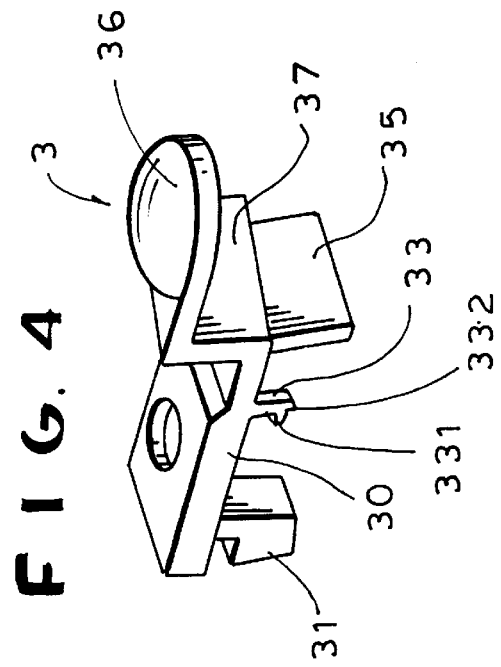

SINGLE-LEVER MIXING VALVE WITH OVERRIDE

FIELD OF THE INVENTION

The present invention relates to a single-lever mixing valve. More particularly this invention concerns a faucet assembly incorporating such a valve.

BACKGROUND OF THE INVENTION

A standard single-lever valve has a deck- or wall-mount housing provided internally with a valve cartridge from which extends an actuating stem. A handle mounted on the stem can pivot about a flow-control axis to adjust the rate of flow through the cartridge and about a different temperature-control axis to control the mix of hot and cold water that is fed to an output, normally a spout. It is therefore possible to adjust flow rate and temperature in an extremely easy manner that the user quickly adjusts to.

Nowadays safety and conservation requirements demand that, however, the valve be capable of limiting the flow rate and/or maximum temperature of the outputted water. Thus abutments are provided as described in European patent applications 0,426,639 of D'Alayer and 0,662,577 of Hirsh as well as in German patent 3,607,349. In these systems it is possible to set the valve so that the maximum temperature it can output is limited and/or the maximum amount of flow through it is limited. In some cases the handle must be actuated with greatly increased force to get past the preset partial-flow or high-temperature setting and in others the handle must be actuated with respect to a third axis in order to override the safety settings.

All such system are fairly cumbersome. In addition the override arrangements are often so complex that with time they either cease functioning altogether so that there is no flow or temperature limit, or so that one cannot override the flow or temperature limit.

OBJECTS OF THE INVENTION

It is therefore an object of the present invention to provide an improved mixing valve with an override feature.

Another object is the provision of such an improved mixing valve with an override feature which overcomes the above-given disadvantages, that is which is easy to use and simple enough that it can be counted on to have a long service life.

SUMMARY OF THE INVENTION

A valve assembly has according to the invention a housing having an abutment and a valve cartridge in the housing having an actuating stem displaceable about a flow-control axis for varying a flow rate between a maximum flow and a minimum flow and about a temperature-control axis for varying temperature of the flow. A handle connected to the stem carries another abutment engageable with the housing abutment in a position of the valve cartridge corresponding to partial flow through the cartridge. A deflectable override button on the handle is operable to displace the handle abutment out of engagement with the housing abutment.

Thus with the system of the invention if the user simply flips the handle up to turn the water on, flow will automatically be limited. It is necessary to take a wholly separate action, normally depressing the button, to override this partial-flow setting. The separate action is, however, fairly straightforward, not involving a complex axial depression of the handle for example, so it is easily effected. The abutment structure is robust and can be counted on to have a long service life.

In accordance with the invention a rocker pivotal in the handle about a rocker axis has one end formed with the button and another end formed with the handle abutment. A spring urges the rocker into a position with the button projecting from the handle and the handle abutment engageable with the housing abutment. The rocker is formed with a skirt covering and protecting the spring and the housing can be formed with a hole and is provided over this hole with a membrane button covering the rocker button and engageable therewith. The membrane button is formed of a deflectable elastomer and is provided with a harder mounting ring fitted in the hole. Normally the rocker is formed with a pair of pivot pins defining the rocker axis and the handle is formed with a seat in which the pins are pivotally seated.

The rocker is formed with deflectable tabs formed with the pins and the pins have beveled edges. The housing is formed with a hole having edges formed with the seat so that the tabs can be deflected to snap the pins into the seat.

Alternately a slider displaceable in the handle has one end forming the button and an opposite end forming the handle abutment. In this case the handle has an actuating arm formed by a pair of parallel and spaced rods and the button is between the rods. Here again a spring urges the slider into an outer position with the button projecting from the handle and the handle abutment engageable with the housing abutment. In either embodiment a screw securing the handle to the stem is accessible via a central hole through the rocker or slider.

The valve cartridge according to the invention is provided with a ring forming the housing abutment. This ring can be angularly stepped and the ring and cartridge can be formed with interengaging formations permitting the ring to be mounted on the cartridge in any of a plurality of angularly offset positions. A cover is snap fitted to the handle to cover all of the rocker or slider except the button and the element forming the rocker or slider is molded of plastic. It is also possible to provide the handle abutment with a screw engageable with the housing abutment and screwable in and out to vary a partial-flow setting of the valve cartridge.

The housing according to the invention is formed with an opening through which the button projects and the cartridge can have a temperature-limiting ring forming the housing abutment. Normally the cartridge is provided with a ring forming the housing abutment.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 2 is a partly sectional top view of the FIG. 1 valve;

FIG. 3 is a cross section taken along line III—III of FIG. 2;

FIG. 4 is a larger-scale perspective view of an element of the valve;

SPECIFIC DESCRIPTION

Figure 1:
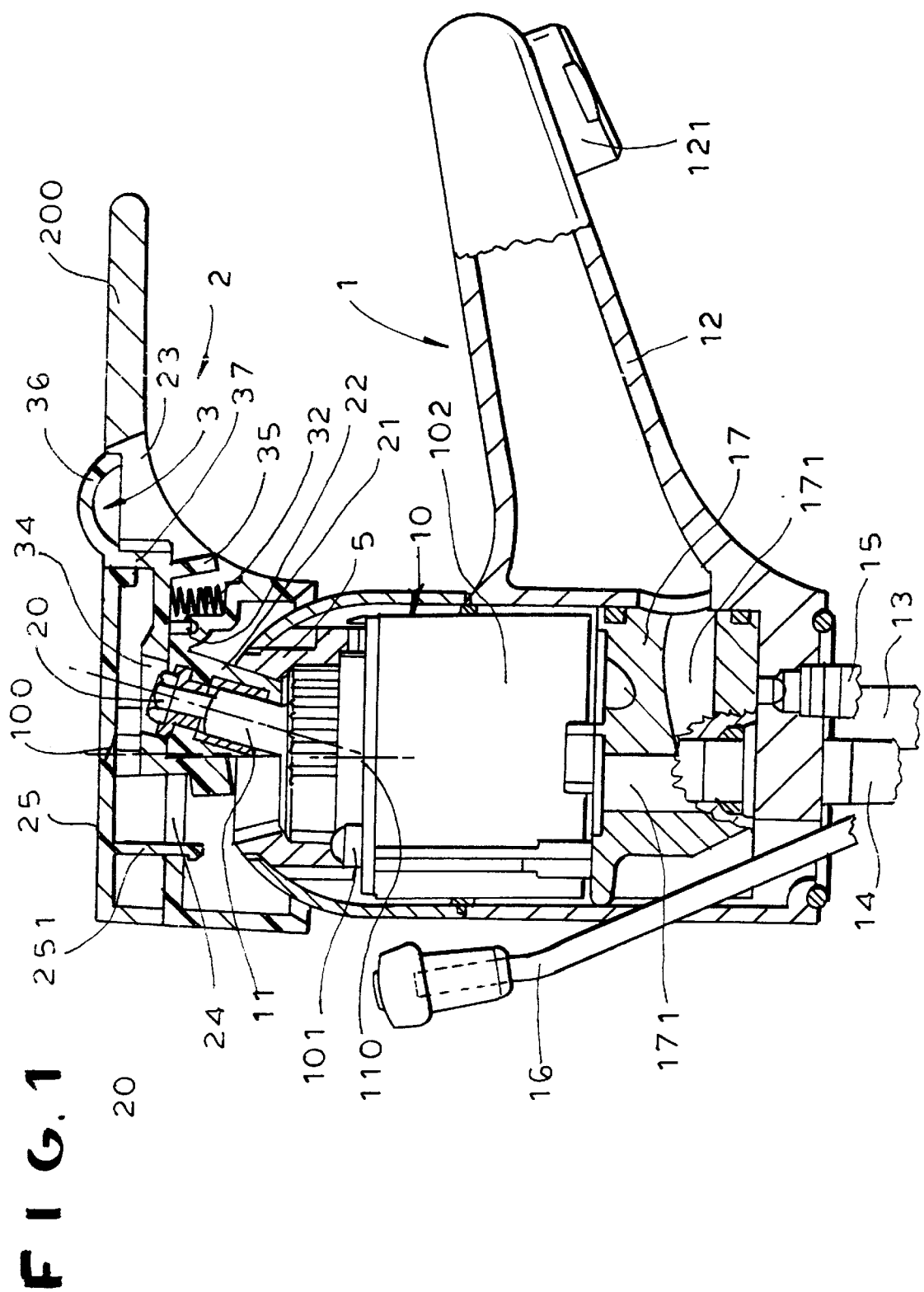
FIG. 1 is a vertical section through a valve according to the invention.

As seen in FIGS. 1 through 7 a mixing-valve assembly 1 according to this invention basically comprises a valve 10 operated by a handle 2 having an override element 3. The assembly 1 is secured to an unillustrated deck by a mounting bolt 15 and hot- and cold-water feed lines or conduits 13 and 14 extend up through a base plate 17 to a valve cartridge 102 secured to the base plate 17 by screws 101. Mixed or tempered water exits the cartridge 102 via a passage 171 to flow via a faucet arm or spout 12 to an aerator 121. A stem 11 projects upward along an axis 111 from the cartridge 102 and can be rotated about a stationary axis 100 of the valve 10 to vary the temperature of the outflowing water and can be tipped about an axis 110 perpendicular to the axis 100 to vary the rate of flow. In the position of FIG. 1 the valve 10 is closed, that is there is no flow from the spout 12. A drain-control rod 16 extends downward through the base plate 17 to operate an unillustrated drain valve.

The handle 2 has a head 20 with a socket sleeve 21 secured by a screw 26 to the stem 11 and an arm 200 extending from the head 20. A molded plastic cap or cover 25 fits over the head 20 and has deflectable arms 251 projecting through and gripping a hole 24 in the head 20 to hold it in place thereon.

The override element 3 is formed as a molded-plastic rocker 30 (see in particular FIG. 4) having a front end formed with an offset 37 provided with a round actuating button 36 exposed at a hole 23 in the handle 20 and a rear end provided with a downwardly extending abutment tab 31 that can engage an inside periphery of an abutment ring 5 fixed on the valve 10. Centrally the rocker 30 has two downwardly extending tabs 33 each formed with an outwardly projecting pin 331 having a lower beveled side 332. The head 20 is formed with an aperture 22 having sides 221 beveled upward at 222 as shown in FIG. 3 so that these tabs 33 can be snapped through the aperture 22 to mount the element 3 for rocking about an axis 300 parallel to the axis 110. At its outer or front end the rocker 30 has a downwardly projecting skirt 35 behind which is provided a compression spring 32 that urges the button 36 upward and the abutment 31 downward. Centrally the rocker 30 is formed with a throughgoing hole 34 giving access, when the cover 25 is removed, to the screw 26 securing the lever 2 to the valve stem 11.

In the position of FIG. 1 all flow through the valve 10 is blocked while in the FIG. 2 position, with the handle 200 parallel to the spout 12, only cold water exits the spout 12.

Figure 5:
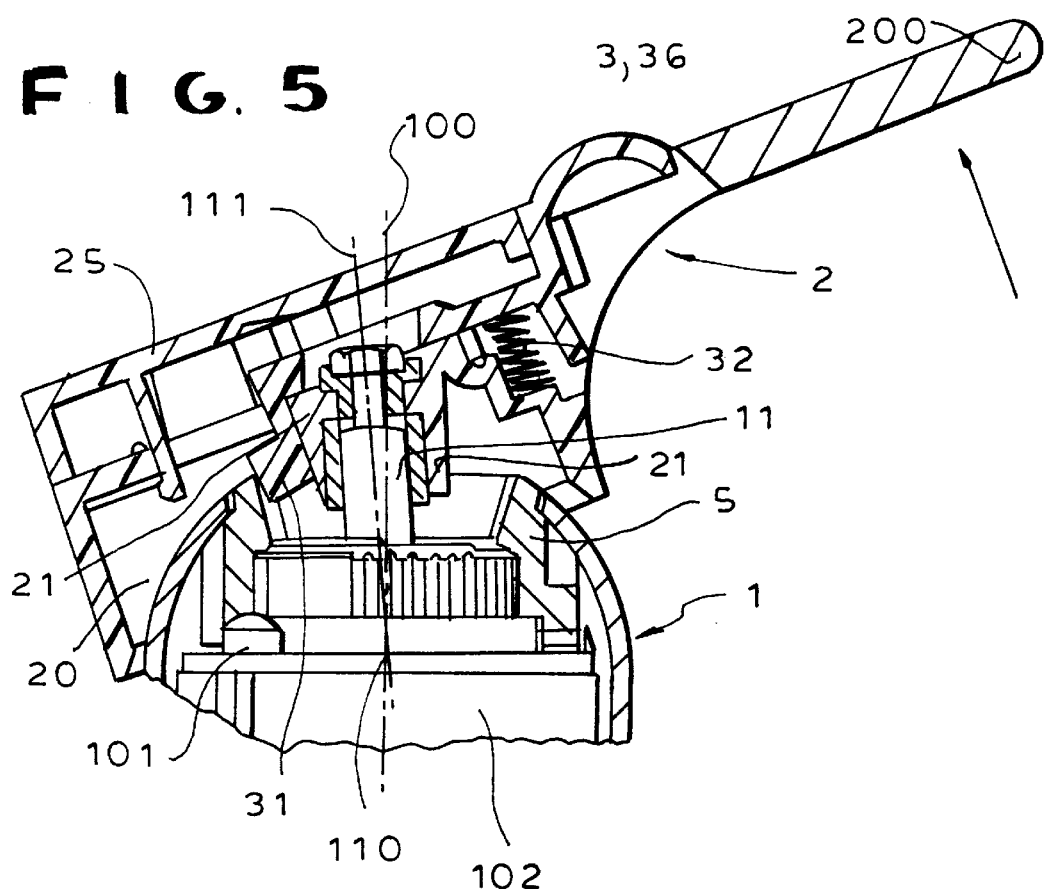
FIGS. 5, 6, and 7 are views like FIG. 1 with the valve in the normal half-open position, with the override actuated, and with the override actuated and the valve moved into the full-open end position.
Figure 14:
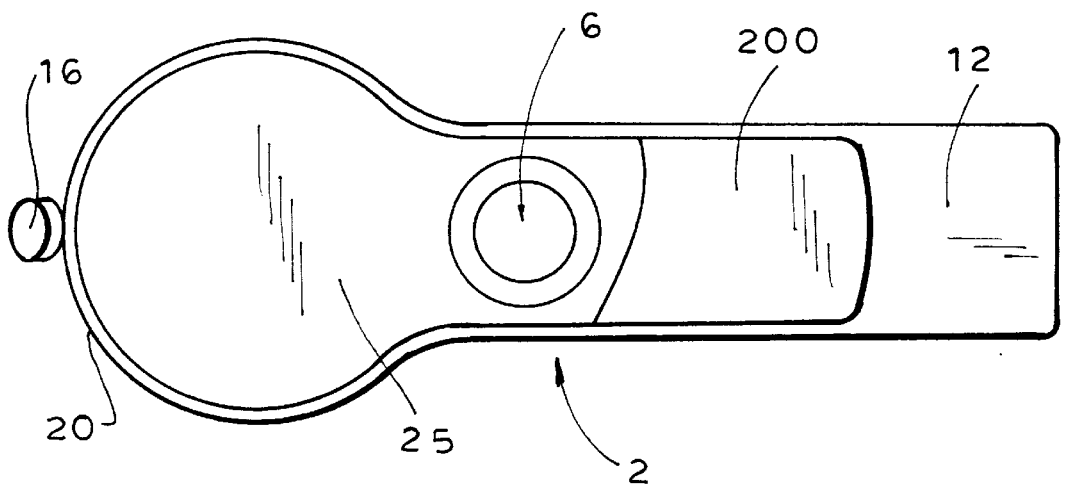
FIG. 14 is a top view of the FIG. 13 valve.

When, however, the handle 200 is raised as shown in FIG. 5 the valve 10 permits flow, mixing water from the hot and cold inlets 13 and 14 depending on the position of the handle 200 relative to the axis 100, with the flow rate increasing until the abutment 31 engages the ring 5. In this position, flow through the valve 10 is about 50% of the maximum possible flow it can pass. Thus water is spared in that if a user simply flips up the handle 200, a moderate flow will issue from the spout 12 which is normally enough for use.

Figure 6:
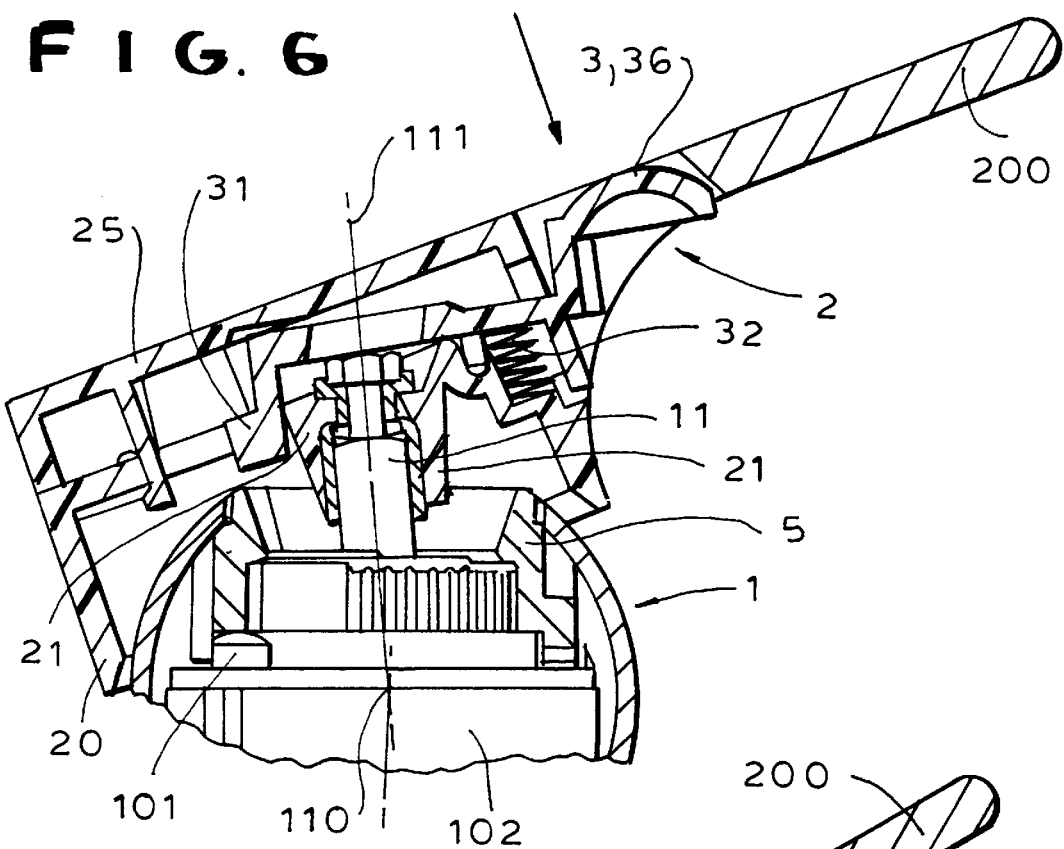
Figure 7:
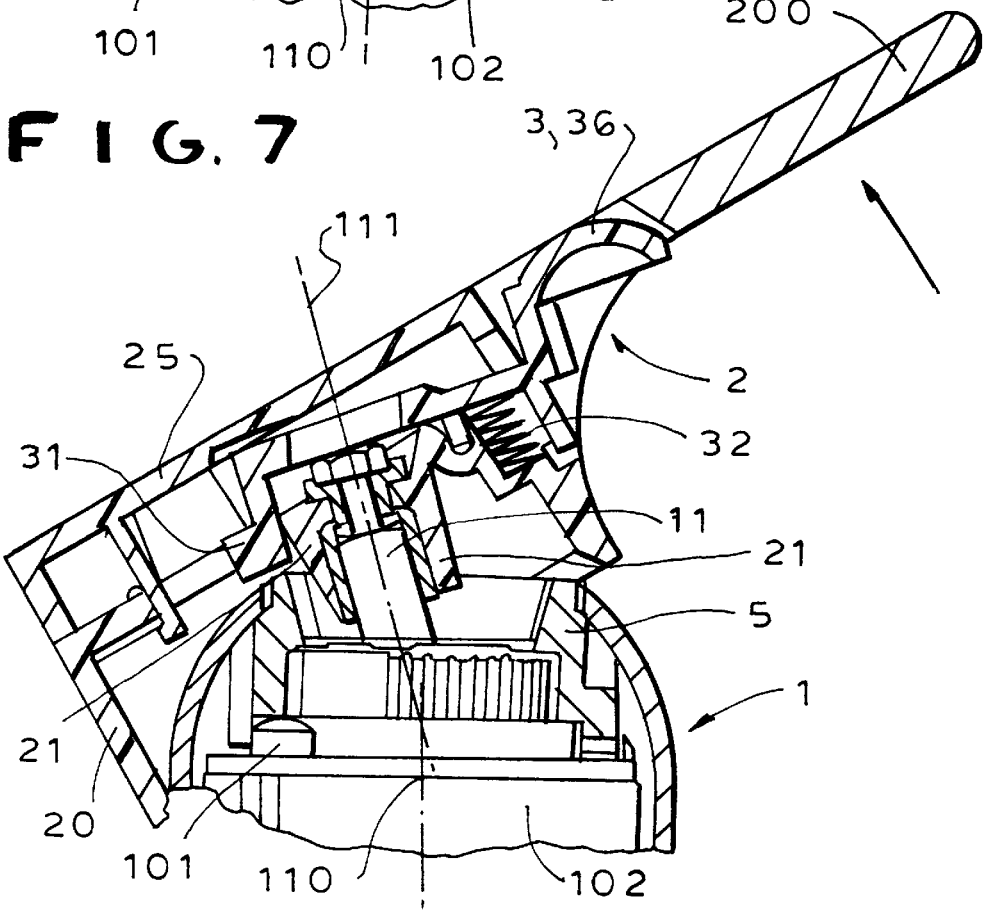
Figure 8:
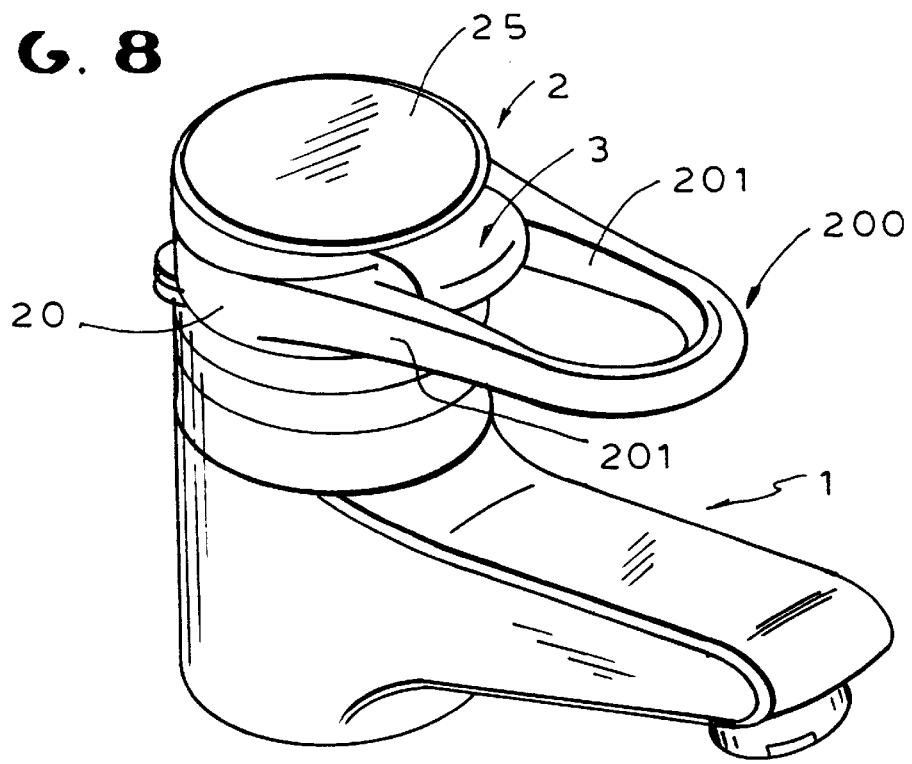
FIG. 8 is a perspective view of another valve according to the invention
Figure 9:
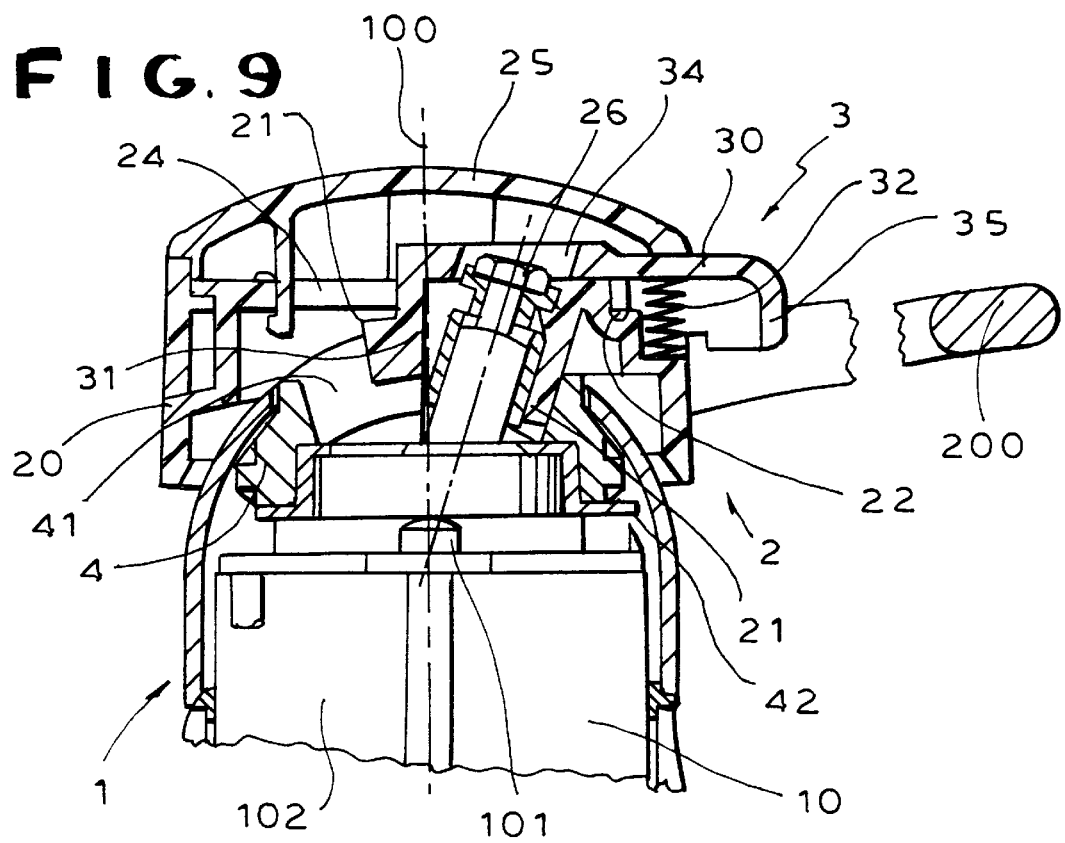
FIG. 9 is a vertical section through the FIG. 8 valve.

If, however, heavier flow is needed, for instance to fill a bucket, the user depresses the button 36 as shown in FIG. 6 to tip the rocker 30 about its axis 300 and lift the abutment 31 off the ring 5. Thereafter as shown in FIG. 7 further upward pivoting of the handle 200 is possible until the maximum throughput of the valve 10 is exploited.

When the handle 200 is again lowered, the spring 32 will cause the abutment 31 to drop back down inside the ring 5 to restore the flow-limiting function of the rocker 30. Whether the button 36 is depressed or not, the normal temperature-adjusting function of the valve 10, caused by pivoting the stem 11 about the axis 100, remains the same.

In the arrangement of FIGS. 8 through 12 the handle 200 is U-shaped and has two arms 201 that tangentially join the head 20. There is no button 36 on the element 30 and the front skirt 35 is positioned between the arms 201 of the handle 200.

Here a temperature abutment ring 4 is formed with a slot 41 in which can slide the square-section socket part 21 of the head 20, the ring 4 being thus coupled to rotate about the axis 100 with the head 20. The ring 4 sits on a lower ring 42 on which the ring 4 can rotate about the axis 100 to a limited extent and the lower ring 42 can be mounted in any of a plurality of angularly offset positions on the handle 2. Thus this abutment ring 4 also serves for setting a maximum high temperature of flow through the valve 10 as described in above-cited German patent 3,607,349. Here the element 30 does not rock, but instead slides in a plane parallel to the handle 200. This slider 30 has a hook 351 that retains the slider 30 in its pushed-in position shown in FIG. 12 but engageable with an edge 43 of the abutment ring 4 to free it.

Figure 10:
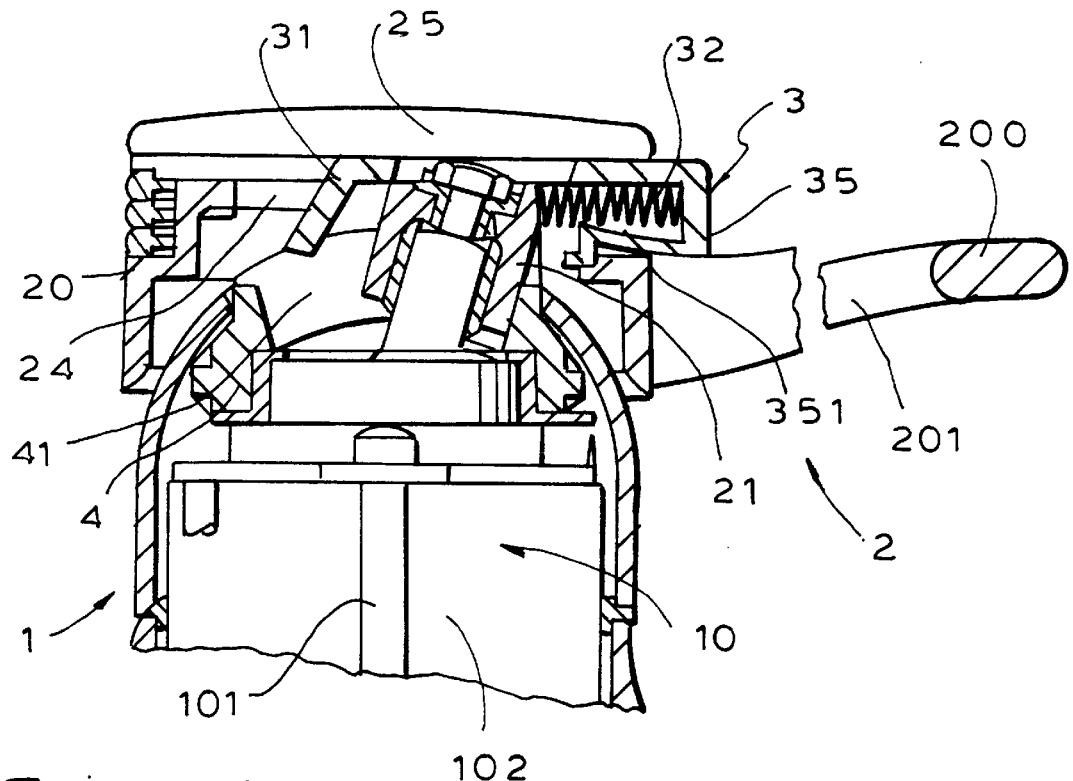
FIGS. 10, 11, and 12 are views corresponding to the positions of respective FIGS. 5, 6, and 7 of the FIG. 8 valve.
Figure 11:
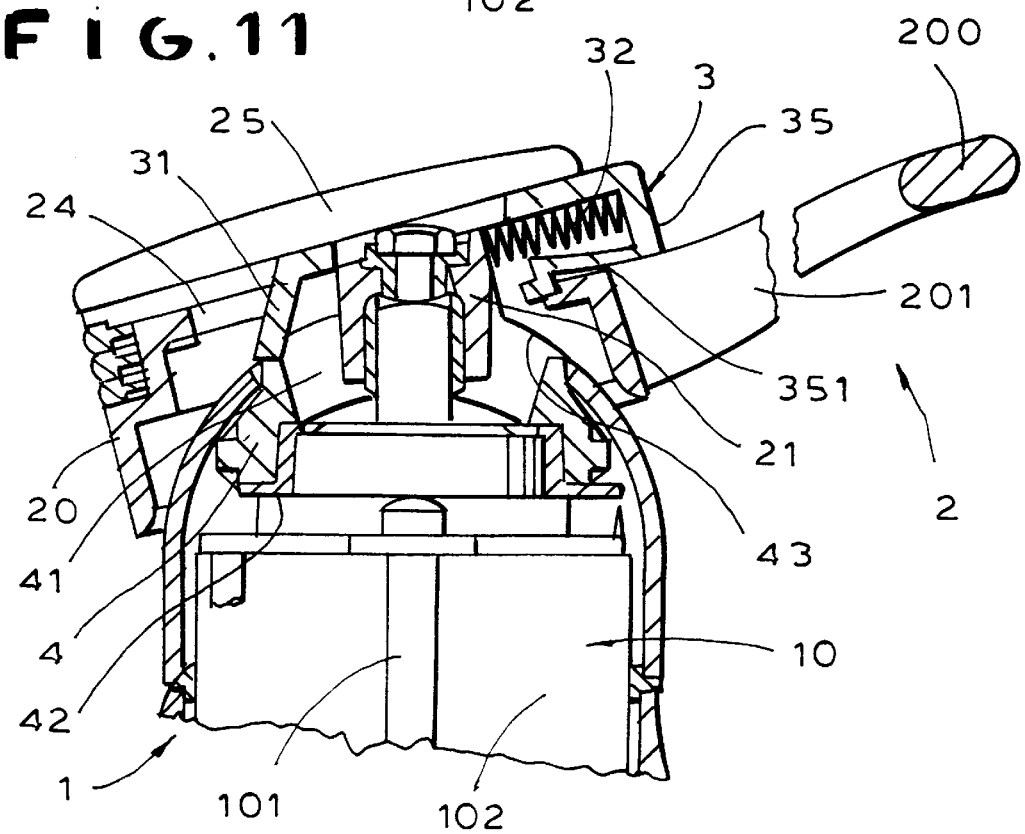
Figure 12:
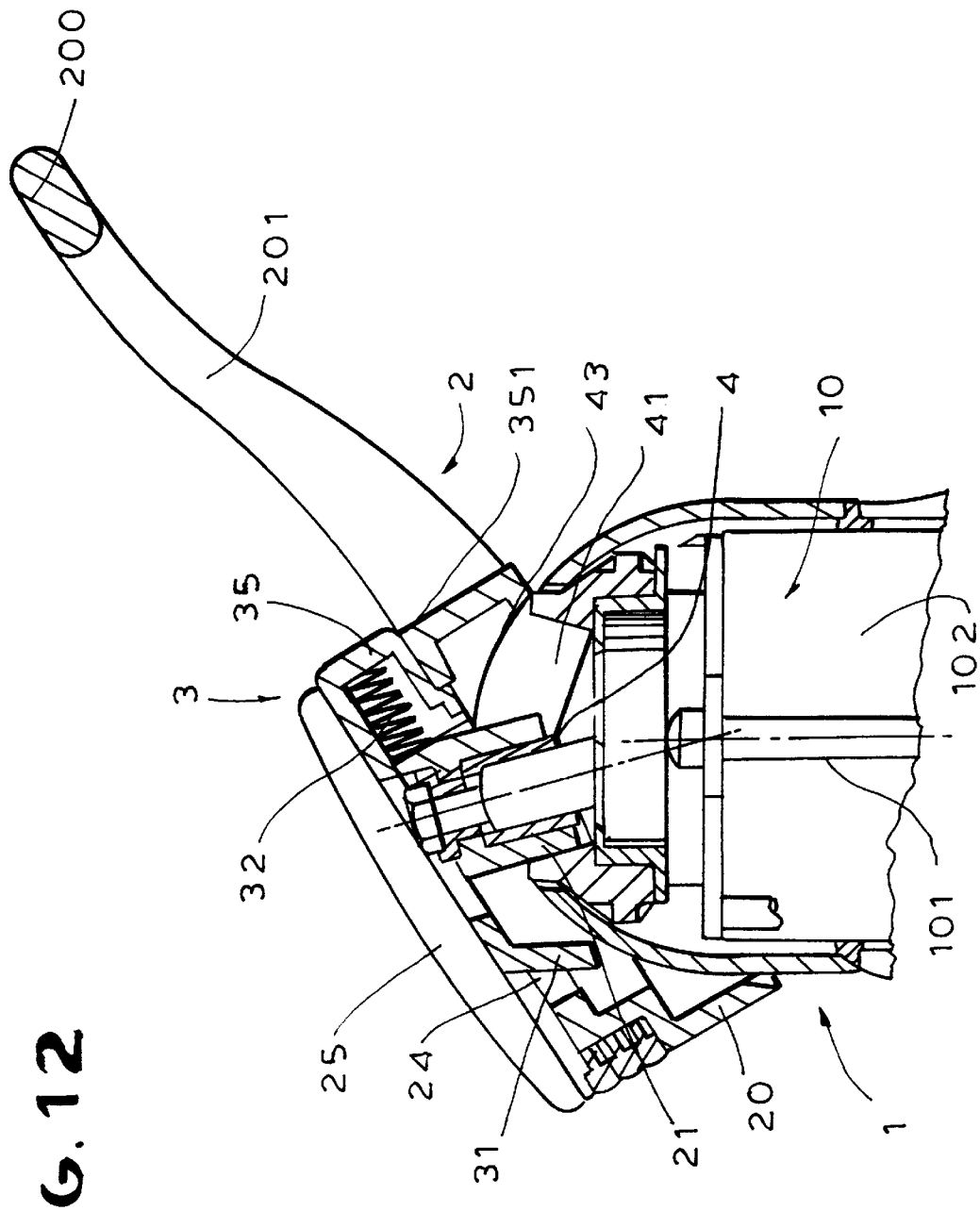
Figure 13:
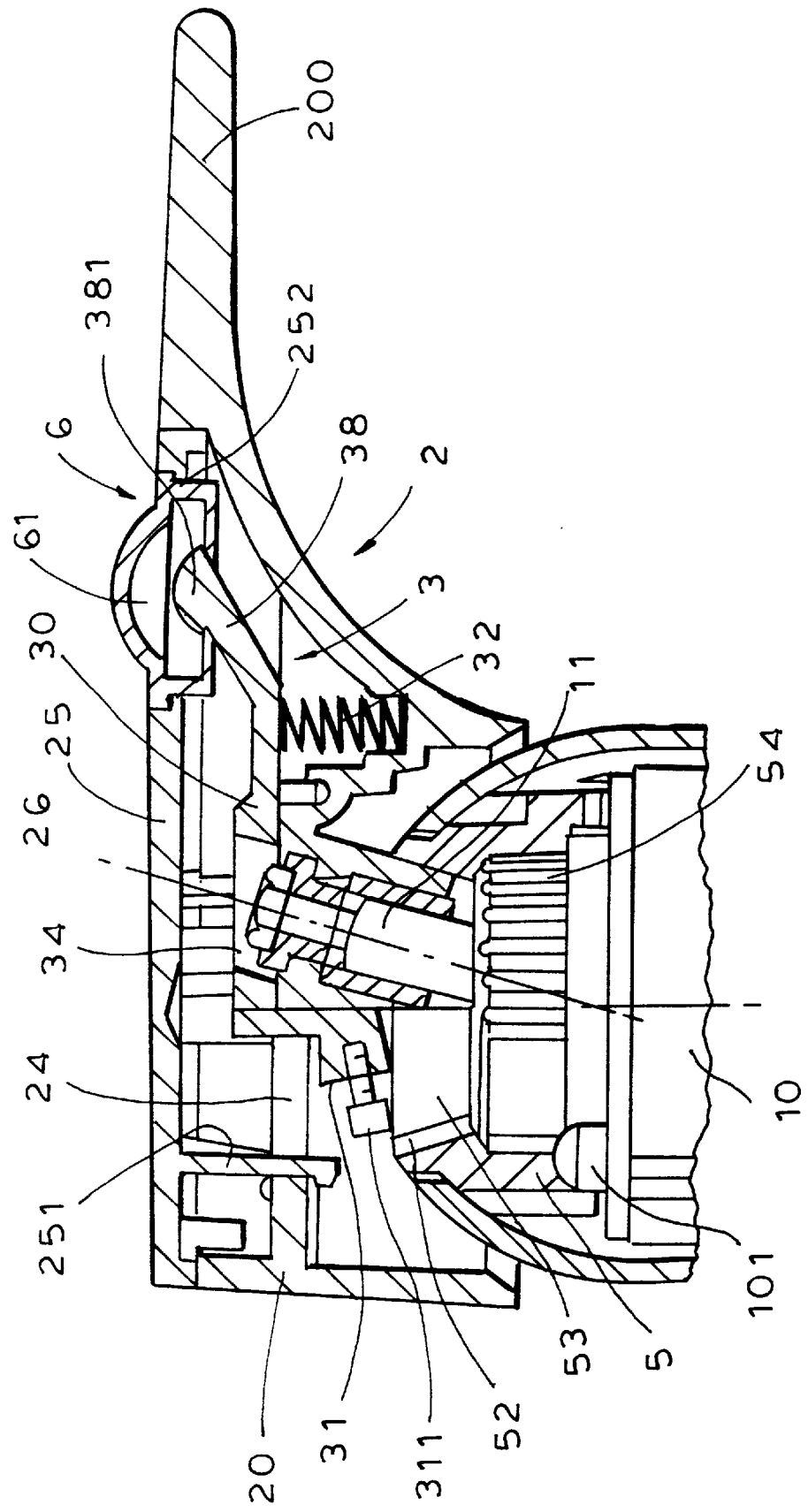
FIG. 13 is a vertical section through a further valve in accordance with the invention.
Figure 15:
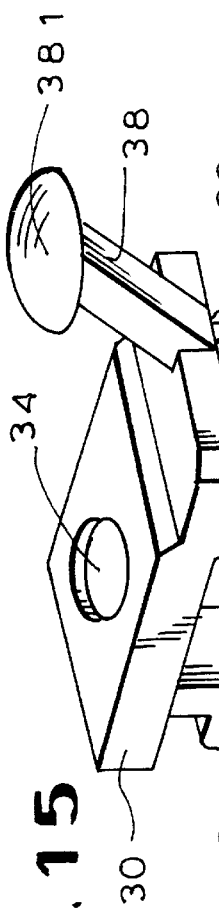
FIG. 15 is a large-scale perspective view of a detail of the FIG. 13 valve.

Thus in the FIG. 10 position the valve 10 is closed. The hook 351 is not engaged behind the edge of the head 20. Raising the handle 200 as shown in FIG. 11 causes the abutment part 31 to engage the ring 4 and prevent further upward pivoting of the handle 200. Only when the slider 30 is pushed in, can the handle 200 be further raised as shown in FIG. 12, with the hook 351 engaging behind the edge of the head 20 to retain the slider 30 in this pushed-in position. When the handle 20 is lowered to the starting position, the ring edge 43 engages ends of the hook 351 to free it so the spring 32 can push the slider 30 back out.

Figure 18:
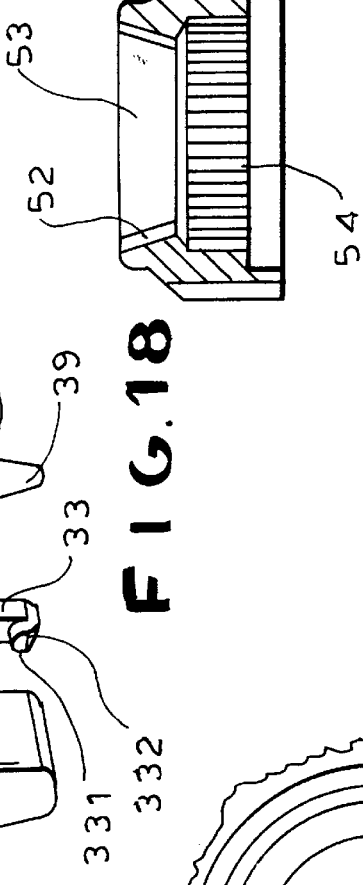
FIG. 18 is a detail view of the abutment ring of the FIG. 13 valve.
Figure 19:
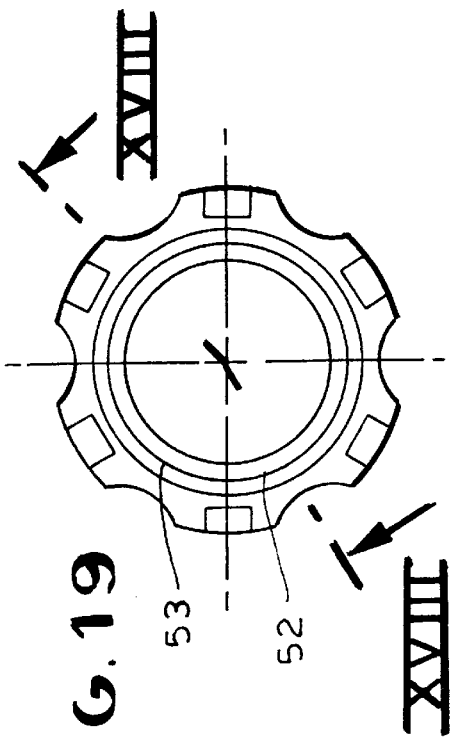
FIG. 19 is a top view of the valve of FIG. 18, line XVIII—XVIII of FIG. 19 illustrating the section plane of FIG. 18.
Figure 17:
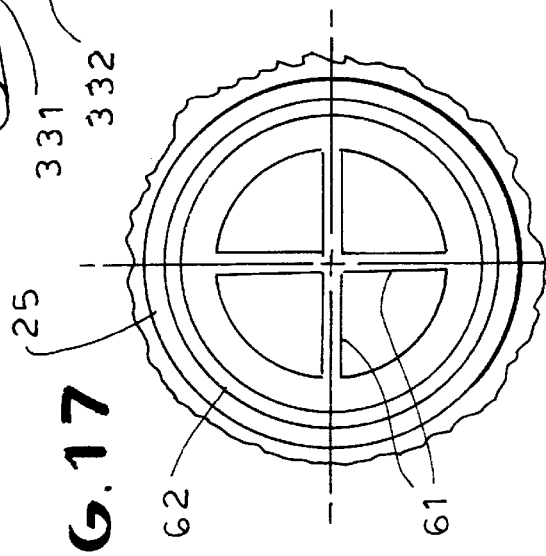
FIG. 17 is a bottom view of the structure seen in FIG. 16.
Figure 16:
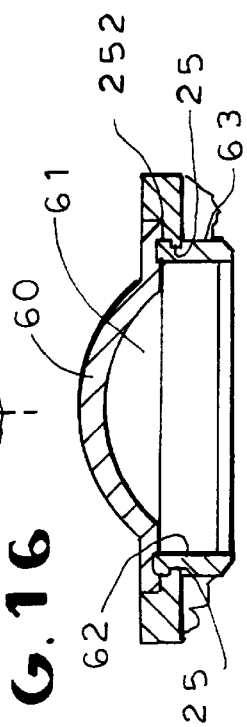
FIGS. 16 is a section through a detail of the FIG. 13 valve.

In FIGS. 13 through 19 another arrangement is shown where the rocker 30 is wholly inside the handle 2 and is provided with an arm 38 having a head 381 engaged under a membrane button 6 provided in a cutout 252 of the cap 25. Thus button 6 comprises a part-spherical membrane 60 having crossing reinforcing ribs 61 and a mounting snap ring 62. The membrane 60 is made of a thermoplastic elastomer and the ring 62 of a harder polypropylene with latching tabs 63 for securing it in the opening 252. In addition the rocker 30 has a pin 39 that centers the spring 32. Here the rocker 30 is actuated by pressing on the membrane button 6 whose reinforcing ribs 61 bear directly on the head 381, tipping the rocker 30 as in FIGS. 1 through 7. Here also the abutment part 31 is provided with a screw 311 that can be screwed in and out to adjust the semiopen position of the valve FIGS. 18 and 19 show the abutment ring 5 with three different abutment regions 51, 52, and 53 and with internal teeth 54 that allow it to be fitted in different angular positions on the valve cartridge 102. Thus it is possible to set three different stop positions for the rocker 30 by appropriate mounting of the ring 5.

We claim:

1. A valve assembly comprising:

a housing having an abutment;

a valve cartridge in the housing having an actuating stem displaceable about a flow-control axis for varying a flow rate between a maximum flow and a minimum flow and about a temperature-control axis for varying temperature of the flow;

a handle connected to the stem, formed with an outwardly projecting arm, and carrying another abutment engageable with the housing abutment in a position of the valve cartridge corresponding to partial flow through the cartridge;

a deflectable override button on the handle immediately adjacent the arm and displaceable relative to the handle to move the handle abutment out of engagement with the housing abutment;

a rocker pivotal in the handle about a rocker axis and having one end formed with the button and another end formed with the handle abutment; and a spring urging the rocker into a position with the button projecting from the handle and the handle abutment engageable with the housing abutment, the rocker being formed with a skirt covering and projecting the spring.

2. The valve assembly defined in claim 1 wherein the housing is formed with a spout and is connected to cold- and hot-water input lines, the handle extending parallel to the spout in a position with the valve passing only cold water from the cold-water input line to the spout.

3. A valve assembly comprising:

a housing having an abutment;

a valve cartridge in the housing having an actuating stem displaceable about a flow-control axis for varying a flow rate between a maximum flow and a minimum flow and about a temperature-control axis for varying temperature of the flow;

a handle connected to the stem, formed with an outwardly projecting arm, and carrying another abutment engageable with the housing abutment in a position of the valve cartridge corresponding to partial flow through the cartridge;

a deflectable override button on the handle immediately adjacent the arm and displaceable relative to the handle to move the handle abutment out of engagement with the housing abutment;

a rocker pivotal in the handle about a rocker axis and having one end formed with the button and another end formed with the handle abutment; and a spring urging the rocker into a position with the button projecting from the handle and the handle abutment engageable with the housing abutment, the housing being formed with a hole and being provided over this hole with a membrane button covering the rocker button and engageable therewith.

4. The valve assembly defined in claim 3 wherein the membrane button is formed of a deflectable elastomer and is provided with a harder mounting ring fitted in the hole.

5. A valve assembly comprising:

a housing having an abutment;

a valve cartridge in the housing having an actuating stem displaceable about a flow-control axis for varying a flow rate between a maximum flow and a minimum flow and about a temperature-control axis for varying temperature of the flow;

a handle connected to the stem, formed with an outwardly projecting arm, and carrying another abutment engageable with the housing abutment in a position of the valve cartridge corresponding to partial flow through the cartridge;

a deflectable override button on the handle immediately adjacent the arm and displaceable relative to the handle to move the handle abutment out of engagement with the housing abutment; and a rocker pivotal in the handle about a rocker axis and having one end formed with the button and another end formed with the handle abutment, the rocker being formed with a pair of pivot pins defining the rocker axis and the handle being formed with a seat in which the pins are pivotally seated.

6. The valve assembly defined in claim 5 wherein the rocker is formed with deflectable tabs formed with the pins and the pins have beveled edges, the housing being formed with a hole having edges formed with the seat, whereby the tabs can be deflected to snap the pins into the seat.

7. A valve assembly comprising:

a housing having an abutment;

a valve cartridge in the housing having an actuating stem displaceable about a flow-control axis for varying a flow rate between a maximum flow and a minimum flow and about a temperature-control axis for varying temperature of the flow;

a handle connected to the stem, formed with an outwardly projecting arm, and carrying another abutment engageable with the housing abutment in a position of the valve cartridge corresponding to partial flow through the cartridge;

a deflectable override button on the handle immediately adjacent the arm and displaceable relative to the handle to move the handle abutment out of engagement with the housing abutment;

a screw securing the handle to the stem; and an element having one end formed with the button and an opposite end forming the handle abutment and formed between its ends with a hole aligned with the screw.

8. The valve assembly defined in claim 1 wherein the valve cartridge is provided with a ring forming the housing abutment.

9. The valve assembly defined in claim 8 wherein the ring is angularly stepped and the ring and cartridge are formed with interengaging formations permitting the ring to be mounted on the cartridge in any of a plurality of angularly offset positions.

10. A valve assembly comprising:

a housing having an abutment;

a valve cartridge in the housing having an actuating stem displaceable about a flow-control axis for varying a flow rate between a maximum flow and a minimum flow and about a temperature-control axis for varying temperature of the flow;

a handle connected to the stem, formed with an outwardly projecting arm, and carrying another abutment engageable with the housing abutment in a position of the valve cartridge corresponding to partial flow through the cartridge;

a deflectable override button on the handle immediately adjacent the arm and displaceable relative to the handle to move the handle abutment out of engagement with the housing abutment; and an element in the handle and having one end forming the button and an opposite end forming the handle abutment; and a cover snap fitted to the handle and covering all of the element except the button.

11. The valve assembly defined in claim 10 wherein the element is molded of plastic.

12. The valve assembly defined in claim 1 wherein the handle abutment includes a screw engageable with the housing abutment and screwable into and out to vary a partial-flow setting of the valve cartridge.

13. The valve assembly defined in claim 1 wherein the handle is formed with an opening through which the button projects.

14. The valve assembly defined in claim 1 wherein the cartridge includes a temperature-limiting ring forming the housing abutment.

* * * * *